United States Patent [19]

Bochen et al.

[11] Patent Number: 4,460,139
[45] Date of Patent: Jul. 17, 1984

[54] CLAMP FOR FIXING ONE OR MORE FLUID CONDUITS

[75] Inventors: Bernd Bochen, Hochheim; Karlheinz Jagstaidt, Raunheim, both of Fed. Rep. of Germany

[73] Assignee: General Motors Company, Detroit, Mich.

[21] Appl. No.: 352,109

[22] Filed: Feb. 25, 1982

[30] Foreign Application Priority Data

Mar. 19, 1981 [DE] Fed. Rep. of Germany ....... 3110688

[51] Int. Cl.³ .............................................. F16L 3/12
[52] U.S. Cl. .................................. 248/68.1; 248/74.3
[58] Field of Search ............... 248/68 R, 74 A, 74 R; 24/20 CW, 20 S, 20 W, 27, 255 SL, 261 R, 115 A, 129 W, 129 C, 115 G

[56] References Cited

U.S. PATENT DOCUMENTS

| | | | |
|---|---|---|---|
| 2,657,442 | 11/1953 | Bedford, Jr. | 248/74.3 |
| 2,928,637 | 3/1960 | Jansson | 248/74 R |
| 2,972,461 | 2/1961 | Balbach et al. | 248/68 R |
| 3,515,363 | 6/1970 | Fisher | 24/255 SL |
| 3,991,960 | 11/1976 | Tanaka | 248/68 R |
| 3,995,795 | 12/1976 | Hogan | 248/68 R |

FOREIGN PATENT DOCUMENTS 589391 6/1947 United Kingdom ............. 248/68 R

*Primary Examiner*—Mickey Yu
*Attorney, Agent, or Firm*—F. J. Fodale

[57] ABSTRACT

A clamp for fixing fluid conduits or the like has a pair of narrow projections at the free end of a clamping strip, an angled mounting bracket at the opposite end and a pair of lugs formed out of the opposite end portion of the clamping strip. The narrow projections cooperate with the lugs to lock the clamping strip around fluid conduits. The clamping strip has a reinforcing bead which starts at the mounting bracket, passes between the lugs and ends at a designated point of bending in the clamping strip.

4 Claims, 7 Drawing Figures

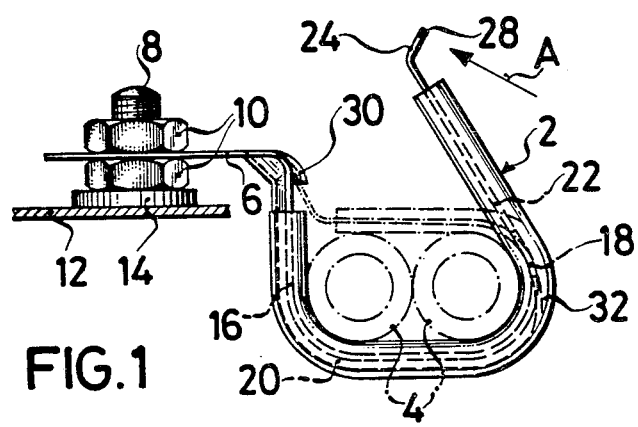
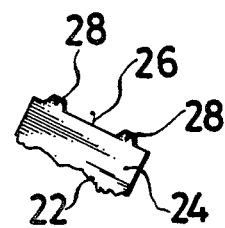
FIG. 1  FIG. 3
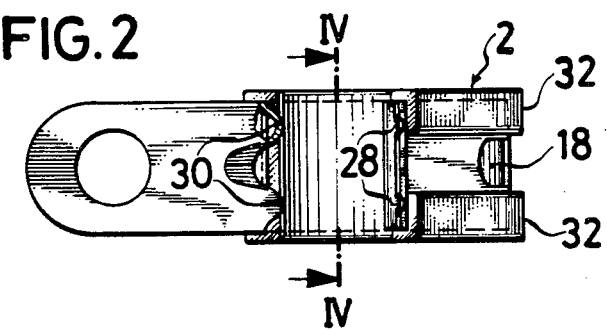
FIG. 2  FIG. 4

CLAMP FOR FIXING ONE OR MORE FLUID CONDUITS

This invention relates generally to a clamp for fixing one or more fluid conduits or the like and, more particularly, to a clamp which has arresting means at the free end of a clamping strip, cooperating counter arresting means for locking the clamping strip around the fluid conduits, and a reinforcing bead extending from a point near the opposite end of the clamping strip to a designated point of bending in the clamping strip.

A clamp of this type has been disclosed in the German Offenlegungsschrift (Printed Patent Application) DE-OS No. 27 03 344 dated Aug. 10, 1978. This prior art clamp serves as a means for supporting a single fluid conduit. The arresting means and counter arresting means at the opposite ends of the clamp are fashioned such that an arresting tab, which is bent out of the clamping strip at one end, engages into a slot at the other end of the clamping strip. The shortcoming of this prior art clamp is the fact that a tool is needed each time the clamp is to be attached or removed. There is also the disadvantage that the cross-sectional area of the clamp is weakened at the areas where the arresting tab is bent out of the clamping strip and in the area where the slot is located. For instance, if these particular areas do not abut the fluid conduits to be clamped, or if the clamp is to be attached to a mounting bracket at one of these areas, the clamp will be subjected to twisting if a force is applied at these particular areas during the process of installation or removal.

The object of the present invention is to provide a clamp which is free of the defects identified above, i.e., a clamp that can be easily opened and closed without the need for any tools. Furthermore, the clamp of the present invention will not be subjected to twisting during the opening or closing operation as a result of the weakening in the cross-sectional area where the clamp is locked together.

This object is accomplished in accordance with the present invention in that the arresting means is in the form of one or more narrow tabs, while the counter arresting means is comprised of suitably shaped lugs formed out of the clamping strip, and in that the reinforcing bead extends as far as the area of the arresting lugs.

This arrangement facilitates the locking and unlocking of the clamp because the short narrow tabs easily snap into and out of engagement with the projecting lugs. The projecting lugs do not cause any weakening in the clamp because the reinforcing bead extends right into the lug area so as to provide resistance to bending or twisting.

Naturally, there could also be provided a plurality of reinforcing beads with arresting lugs being located therebetween. However, the preferred arrangement is one in which one lug is provided on either side of a centrally extending reinforcing bead, and wherein two suitably shaped narrow tabs are provided at the other end of the clamp.

Preferably, the small tabs extend essentially in the direction of closure movement determined by the clamp leg extending from the designated bending area of the clamping strip, and the arresing lugs are likewise arranged in the direction of closure movement. The narrow tabs are formed in a tooth-like pattern on an angled end of the clamping strip and their respective height and width corresponds to about one-tenth of the width of the clamping strip.

One advantageous arrangement is that of combining the clamp with a mounting bracket which may be made so as to form an extension of the clamping strip. With an arrangement of this type it is proposed in accordance with the invention that the mounting bracket form a right angle to the clamping strip, and that the arresting lugs be disposed at the transition between the clamping strip and the mounting bracket, with the reinforcing bead extending to the point at which the mounting bracket starts. A clamp of this type, which is particularly suited for the mounting of automotive fuel lines, offers the advantage that the clamping strip is not subjected to bending when the clamp is being opened or closed, even if a bending force is applied during closing of the clamp at the point where the clamp and mounting bracket are joined together.

Preferably, the reinforcing bead extends from the mounting bracket to the designated point of bending in the clamping strip, and the contour of the clamping strip along this path is complementary to the cross-section or sections of the fluid conduits to be supported.

The invention will now be described in detail by way of exemplary embodiments, with reference to the accompanying drawings, wherein:

FIG. 1 is a side view of an embodiment of the clamp according to the invention.

FIG. 2 is a plan view of the clamp illustrated in FIG. 1.

FIG. 3 is a view in the direction of arrow A in FIG. 1.

FIG. 4 is a cross-section substantially along line IV—IV in FIG. 2 and looking in the direction of the arrows.

Figure 5:
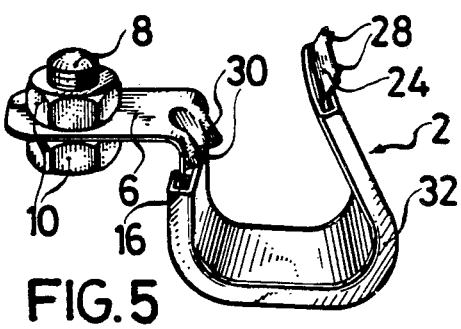
FIG. 5 is a perspective view of the clamp in an open position.

The clamp 2 illustrated in the drawing serves for supporting fluid conduits such as the fuel lines 4 which are indicated in FIG. 1 in dash-dotted lines. The clamp 2 is provided with a mounting bracket 6 which is supported on a threaded bolt 8 by means of a nut 10. The threaded bolt 8 is for attachment to a vehicle floor and serves for securing another member 14 to part 12. The position of clamp 2 in FIG. 1 need not necessarily agree with the actual installation position.

Adjacent the mounting bracket 6 for supporting clamp 2 there is disposed a clamping strip 16, which first extends downwardly at approximately a right angle thereto, then curves to assume a horizontal path, and then curves again into an upward direction, so that two fuel lines of a predetermined diameter may be inserted into the clamp. In the area of the upward curvature of the clamping strip 16 there is provided a designated point of bending 18 which is formed by a cut-out having a predetermined length and width. The cut-out is partially illustrated in FIG. 2.

The clamping strip 16 has a reinforcing bead 20 which extends longitudinally midway of the clamping strip 16 and which has a cross-section which is apparent from FIG. 4. The reinforcing bead 20 starts out at the mounting bracket 6 and terminates at the designated point of bending 18. Immediately behind the designated point of bending 18, the clamping strip 16 forms into a leg 22 that is not provided with a reinforcing bead and which, for the purpose of locking and unlocking the clamp, is adapted for inward or outward bending movement at the designated point of bending. The cut-out at the designated point of bending 18 is disposed or arranged in accordance with the diameter of the fuel lines 4, so that during the locking operation of the clamp, the fuel lines 4 will be solidly embraced as the leg 22 is bent inwardly.

The free end 24 of the leg 22 is angled so as to point essentially in the direction of locking. Two narrow tooth-like tabs 28, whose respective sides are tapered in endwise direction, are formed onto the marginal edge 26 of leg 22. The tabs are usually formed during the stamping operations for manufacturing the clamp. At the transition from the mounting bracket 6 to the clamping strip 16, or in the proximity thereof, there are two bead-shaped arresting lugs 30 formed out of the clamping strip which cooperate with the tabs 28 when the clamp is in its locked state. The closed position of the clamp is indicated in FIG. 1 by the dash-dotted lines.

The arresting lugs 30 are spaced at a distance from one another so as to allow the reinforcing bead 20 to extend therebetween, which will reduce or eliminate the possibility of a weakening in the cross-sectional area of the strip where the lugs 30 are located and thereby essentially eliminate the tendency to bending.

In order to lock the clamp, the leg 22 is pushed downwardly and inwardly from the solid line position shown in FIG. 1 until the tabs 28 snap into the arresting lugs 30 as shown in the dash-dotted line position of leg 22. Unlocking of the clamp is accomplished by exerting a downward pressure on the leg 22. When the leg 22 is released, the bias exerted by the fuel lines 4 onto the leg 22 has the effect that the tabs 28 will slide out of the arresting lugs 30 which, because of the point contact-type locking mechanism and the arrangement of the arresting lugs, will proceed with very little resistance. Thanks to the novel disposition of the arresting lugs 30 and the reinforcing bead 20 extending therebetween, the procedure of locking and unlocking the clamp and the force exerted in connection therewith in the area of the arresting lugs will not cause any twisting of the clamp. The clamp 2 is covered by a rubber jacket 32, except for an area determined by the width of the reinforcing bead 20, which is not covered as shown in FIG. 4.

Figure 6:
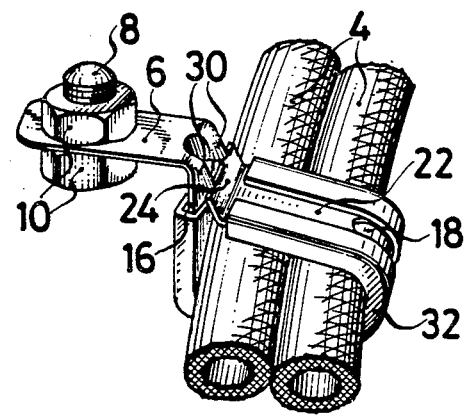
FIG. 6 is a perspective view of the clamp in a closed position around a pair of fuel lines.

FIG. 5 is a perspective view of the clamp 2 in an open position, and FIG. 6 is a perspective view of the same clamp 2 in a closed position around a pair of fuel lines 4.

Figure 7:
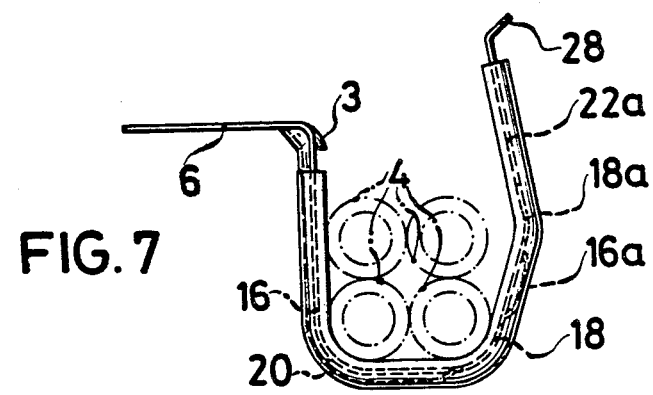
FIG. 7 is a side view of another embodiment of the clamp for several fluid conduits disposed over one another.

FIG. 7 illustrates another embodiment of the invention in which the clamp is adapted to accommodate several fuel lines that are placed above one another. Since the basic structure of this clamp is the same as the one described in the foregoing, identical elements have been identified with like reference numerals. In this embodiment, two pairs of fuel lines 4 are stacked one above the other. The length of the vertical section of the clamping strip 16 adjacent the mounting bracket 6 has been extended accordingly. Following the designated bending point 18 is a section of the clamping strip 16 which is also provided with a reinforcing bead 16a which extends to a second designated bending point 18a. Extending from there is the leg 22a which is adapted for bending in conformity with the fuel lines and which is provided at its free ends with the tabs 28 for engagement with the arresting lugs 30. One could also dispense with the first designated bending point 18 and have the clamping strip 16, which is fashioned to conform to the cross-section of the lines 4, together with the reinforcing bead extending to the second designated bending point 18a.

We wish it to be understood that we do not desire to be limited to the exact details of construction shown and described, for obvious modifications will occur to a person skilled in the art.

The embodiments of the invention in which an exclusive property or privilege is claimed are defined as follows:

1. In a clamp for fixing one or more fluid conduits or the like, which has arresting means at the free end of a clamping strip, cooperating counter arresting means for locking the clamping strip around one or more fluid conduits or the like, and a reinforcing bead extending from a point near the opposite end of the clamping strip to a designated point of bending in the clamping strip, the improvement comprising:
   an angled mounting bracket at one end of the clamping strip,
   the arresting means consisting of one or more narrow projections at an opposite end of the clamping strip,
   said one or more narrow projections being formed at the front edge and in the plane of an obtusely angled end portion of a leg of the clamping strip leading from the designated point of bending,
   the cooperating counter arresting means consisting of a corresponding number of appropriately shaped lugs formed out of the surface of the clamping strip at the transition of the angled attachment bracket and the clamping strip, and
   the reinforcing bead extending into the region of the clamping strip from which the lugs are formed and up to commencement of the mounting bracket.

2. In a clamp having the improvement in accordance with claim 1 wherein the arresting means consist of at least two narrow projections, the cooperating counter arresting means consist of at least two appropriately shaped lugs, and the reinforcing bead extends centrally so that a lug is arranged at each side of the reinforcing bead.

3. In a clamp having the improvement in accordance with claims 1 or 2 wherein the reinforcing bead runs from the mounting bracket up to the designated point of bending and over this path the clamping strip has a shape which corresponds to the cross-section (or cross-sections) of the fluid conduits which are to be fixed.

4. In a clamp having the improvement in accordance with claims 1 or 2 wherein the clamping strip has a second designated point of bending and a second reinforcing bead which extends from the first designated point of bending to the second point of bending whereby the clamping strip is adapted for being locked around a plurality of pairs of fluid conduits stacked one atop another.

* * * * *